United States Patent
Gao et al.

(10) Patent No.: US 11,240,454 B2
(45) Date of Patent: Feb. 1, 2022

(54) HYBRID CMOS IMAGE SENSOR WITH EVENT DRIVEN SENSING

(71) Applicant: OMNIVISION TECHNOLOGIES, INC., Santa Clara, CA (US)

(72) Inventors: Zhe Gao, San Jose, CA (US); Tiejun Dai, Santa Clara, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 101 days.

(21) Appl. No.: 16/862,337

(22) Filed: Apr. 29, 2020

(65) Prior Publication Data

US 2021/0344867 A1 Nov. 4, 2021

(51) Int. Cl.
*H04N 5/3745* (2011.01)
*H04N 5/378* (2011.01)

(52) U.S. Cl.
CPC ......... *H04N 5/37457* (2013.01); *H04N 5/378* (2013.01)

(58) Field of Classification Search
None
See application file for complete search history.

(56) References Cited

U.S. PATENT DOCUMENTS

| 8,780,240 B2 | 7/2014 | Posch et al. |
| 9,961,291 B2 | 5/2018 | Chen |
| 2010/0002115 A1* | 1/2010 | Liu ............... H01L 27/14634 348/308 |
| 2016/0094800 A1* | 3/2016 | Gousev ............ H04N 5/23218 348/310 |
| 2020/0084403 A1* | 3/2020 | Suh ..................... H04N 5/379 |

* cited by examiner

*Primary Examiner* — Mark T Monk
(74) *Attorney, Agent, or Firm* — Christensen O'Connor Johnson Kindness PLLC

(57) ABSTRACT

An image sensor includes a source follower coupled to a photodiode to generate an image signal responsive to photogenerated charge. The image signal is received by image readout circuitry through a row select transistor. A reset transistor resets the photogenerated charge. A first node of mode select circuit is coupled to the reset transistor, a second node is coupled to a pixel supply voltage, and a third node is coupled to an event driven circuit. The mode select circuit couples the first node to the second node during an imaging mode to supply the pixel supply voltage to the reset transistor. The mode select circuit is further configured to couple the first node to the third node during an event driven mode to couple a photocurrent of the photodiode to drive the event driven circuit through the reset transistor to detect changes in the photocurrent.

25 Claims, 4 Drawing Sheets

HYBRID CMOS IMAGE SENSOR WITH EVENT DRIVEN SENSING

BACKGROUND INFORMATION

Field of the Disclosure

This disclosure relates generally to image sensors, and in particular but not exclusively, relates to image sensors that event sensing circuitry.

Background

Image sensors have become ubiquitous and are now widely used in digital cameras, cellular phones, security cameras, as well as, medical, automobile, and other applications. As image sensors are integrated into a broader range of electronic devices it is desirable to enhance their functionality, performance metrics, and the like in as many ways as possible (e.g., resolution, power consumption, dynamic range, etc.) through both device architecture design as well as image acquisition processing.

A typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bit lines that vary as a function of the incident image light. In other words, the amount of image charge generated is proportional to the intensity of the image light, which is read out as analog signals from the column bit lines and converted to digital values to produce digital images (i.e., image data) representing the external scene.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
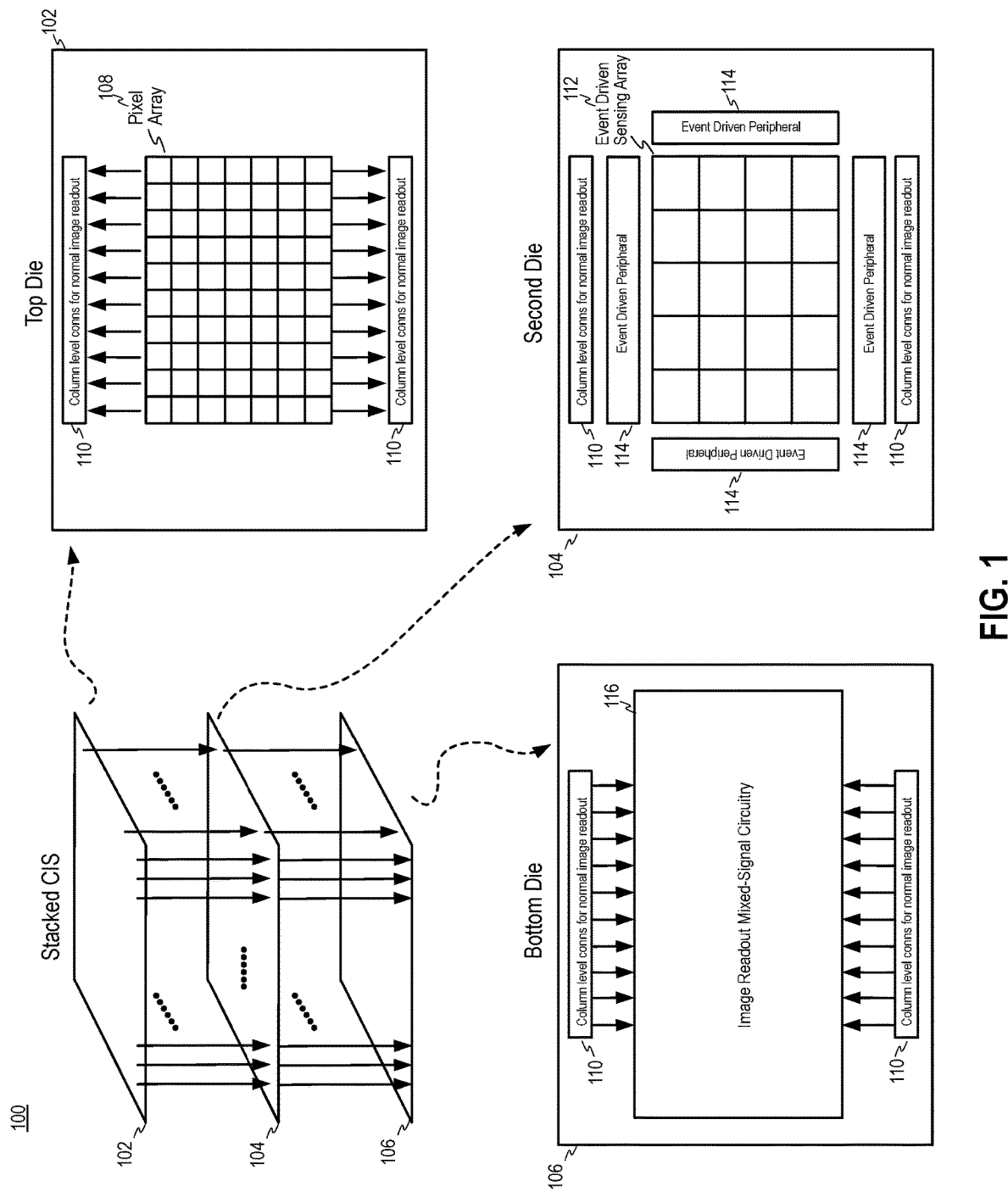
FIG. 1 illustrates one example of stacked complementary metal oxide semiconductor (CMOS) image sensor (CIS) system in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. In addition, common but well-understood elements that are useful or necessary in a commercially feasible embodiment are often not depicted in order to facilitate a less obstructed view of these various embodiments of the present invention.

DETAILED DESCRIPTION

Various examples directed to a hybrid imaging system including a normal image sensing mode and an asynchronous event driven mode are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "lower," "under," "above," "upper," "top," "bottom," "left," "right," "center," "middle," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein interpreted accordingly. In addition, it will also be understood that when a layer is referred to as being "between" two layers, it can be the only layer between the two layers, or one or more intervening layers may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be discussed, various examples of stacked CIS system are disclosed in which a hybrid imaging system with a normal image sensing mode and an asynchronous event driven mode are included. Normal image sensors offer great image and video capabilities. However, one of the limitations with normal images sensors is that normal image sensors do not provide ultra-high frame rates and ultra-high speed capture capabilities that may be useful in a variety of applications such as machine vision, gaming, and artificial intelligence sensing areas. Attempts to provide typical image sensors to with such ultra-high frame rates and ultra-high speed capabilities have resulted in compromised solutions that provide poor quality image captures compared to their normal image sensor counterparts.

In the various examples disclosed herein, a hybrid imaging system is provided in which includes an image sensor includes a combination of a normal image sensing mode that provides great image and video capabilities, and an asynchronous event driven mode that provides ultra-high frame rates and ultra-high speed capabilities for a wide variety of event driven applications.

To illustrate, FIG. 1 illustrates one example of stacked complementary metal oxide semiconductor (CMOS) image sensor (CIS) system 100 in accordance with the teachings of the present invention. As shown in the depicted example, stacked CIS system 100 includes a first die 102, a second die, 104, and a third die 106 that are stacked and coupled together in a stacked chip scheme. In the example, the first die 102, which may also be referred to as the top die 102 of the stacked CIS 100, includes a pixel array 108. The third die 106, which may also be referred to as the bottom die 106 of the stacked CIS 100, includes image readout mixed-signal circuitry 116 that is coupled to the pixel array 108 of the top die 102 through column level connections for normal image readout 110. In one example, the column level connections for normal image readout 110 may be implemented with through silicon vias (TSVs) between the top die 102 and the bottom die 106, which are routed through the second die 104.

In one example, pixel array 108 is a two-dimensional (2D) array including a plurality of pixel cells that include photodiodes exposed to incident light. As illustrated in the depicted example, the pixel circuits cells are arranged into rows and columns to acquire image data of a person, place, object, etc., which can then be used to render an image of a person, place, object, etc. In the example, each pixel circuit cell is configured to photogenerate image charge in response to the incident light. After each pixel cell has acquired its image charge, the corresponding analog image charge data is read out by the readout circuitry 116 in the bottom die 106 through column bit lines, which may be implemented with TSVs included in the column level connections for normal image readout 110. In the various examples, the image charge from each row of pixel array 108 may be read out in parallel through column bit lines by image readout circuitry 116.

In the various examples, the image readout circuitry 116 in the bottom die 106 includes amplifiers, analog to digital converter (ADC) circuitry, associated analog support circuitry, associated digital support circuitry, etc., for normal image readout and processing. In some examples, image readout circuitry 116 may also include event driven readout circuitry, which will be described in greater detail below. In operation, the photogenerated analog image charge signals are readout from the pixel cells of pixel array 108, amplified, and converted to digital values in image readout circuitry 116. In some examples, image readout circuitry 116 may readout a row of image data at a time. In other examples, image readout circuitry 116 may readout the image data using a variety of other techniques (not illustrated), such as a serial readout or a full parallel readout of all pixels simultaneously. The image data may be stored or even manipulated by applying post image effects (e.g., crop, rotate, remove red eye, adjust brightness, adjust contrast, or otherwise).

In the depicted example, the second die 104, which may also be referred to as the middle die 104 of the stacked CIS 100, includes an event driven sensing array 112 that is coupled to the pixel array 108 in the top die 102. In the various examples, the event driven sensing array 112 is coupled to the pixel cells of pixel array 108 through hybrid bonds between the top die 102 and the middle die 104. In one example, the event driven sensing array 112 includes an array of event sensing cells. As will be discussed, in one example, each one of the event sensing cells in event driven sensing array 112 is coupled to the pixel cells of an N×N grouping of pixel cells in pixel array 108 through hybrid bonds between the top die 102 and the middle die 104 to asynchronously detect events that occur in the light that is incident upon the pixel array 108 in accordance with the teachings of the present invention. In the various examples, corresponding event detection signals are generated by the event sensing cells in the event driven sensing array 112. The event detection signals may be coupled to be received and processed by event driven peripheral circuitry 114, which in one example is arranged around the periphery of event driven sensing array 112 in the middle die 104 as shown in FIG. 1. The depicted example also illustrates the column level connections for normal image readout 110 that are routed through middle die 104 between the top die 102 and the bottom die 106.

Figure 2:
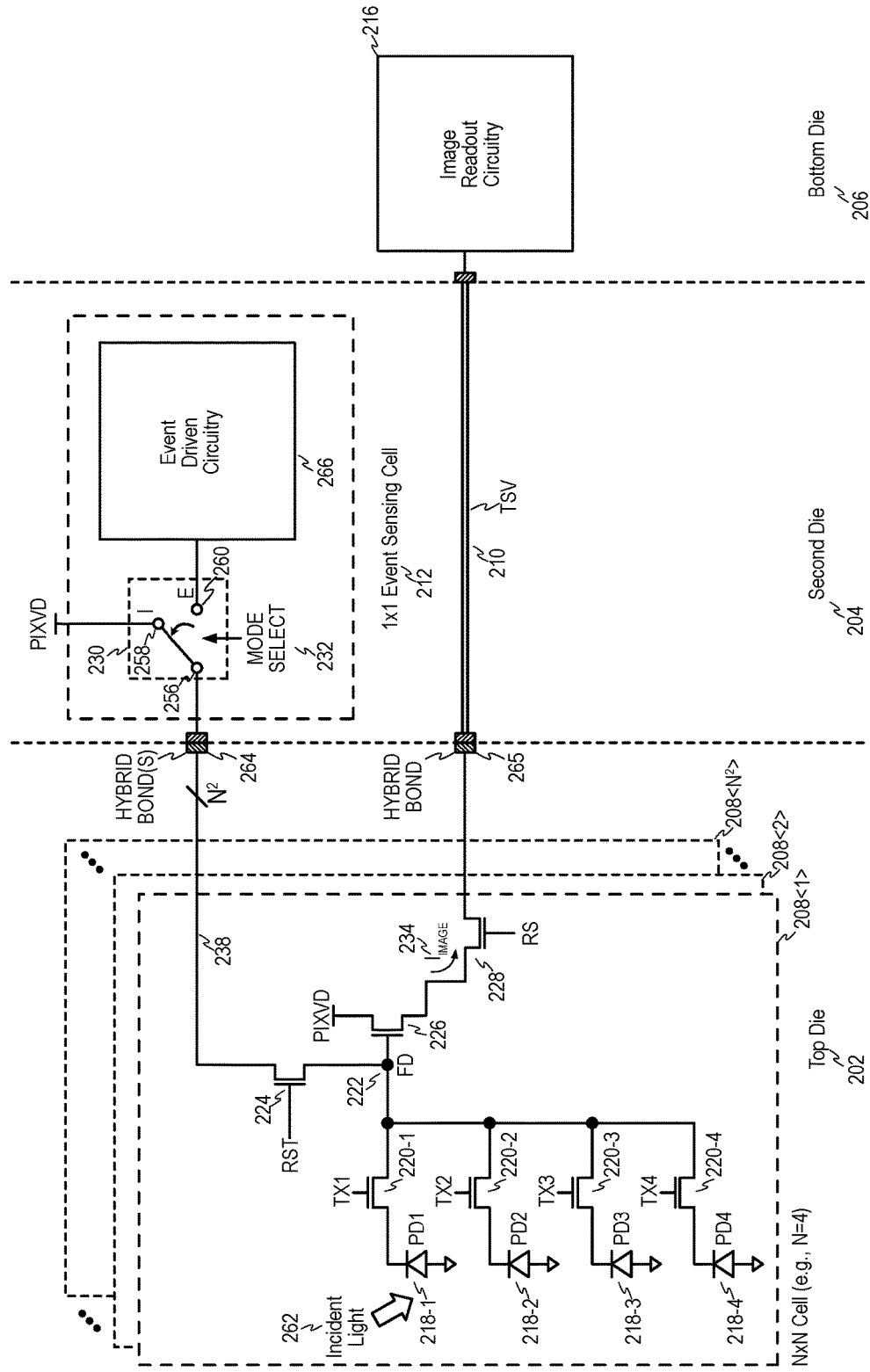
FIG. 2 illustrates one example schematic of an image sensor with a normal imaging mode selected and an event driven mode deselected in accordance with the teachings of the present disclosure.

FIG. 2 illustrates one example schematic of stacked CIS system 200 with a normal imaging mode selected and an event driven mode deselected in accordance with the teachings of the present disclosure. It is appreciated the stacked CIS system 200 of FIG. 2 may be one example of the stacked CIS system 100 as shown in FIG. 1, and that similarly named and numbered elements described above are coupled and function similarly below.

In the example depicted in FIG. 2, a P×Q cell and/or an N×N grouping of pixel cells of the pixel array that are included in top die 202 is illustrated. As such, the illustrated example shows pixel cells 208<1>, 208<2>, . . . 208<$N^2$>. In one example, N=4. It is appreciated that in other examples, N may be equal to a different number. In an example with N=4, the N×N cell therefore includes $4^2$ or 16 pixel cells. Thus, for a 64-megapixel (MP) array, the depicted pixel array includes 1 MP of the example 4×4×(2× 2) cells illustrated in FIG. 2.

As shown in the example depicted in FIG. 2, each pixel cell 208 is a shared pixel design that includes photodiodes 218-1, 218-2, 218-3, and 218-4 that are configured to photogenerate charge in response to incident light 262. Thus, in one example, the four photodiodes 218-1, 218-2, 218-3, and 218-4 may be arranged as a 2×2 arrangement of photodiodes in a pixel array. In other examples, it is appreciated that a different number of photodiodes may be included, which may have other arrangements such as for example as a 3×3 arrangement of photodiodes, a 2×4 arrangement of photodiodes, the P×Q arrangement of photodiodes, etc. In other examples, it is also appreciated that non-shared pixel designs that include one photodiode may also be utilized, such as an example that will be illustrated in FIG. 3 below. In the example illustrated in FIG. 2, transfer transistors 220-1, 220-2, 220-3, and 220-4 are coupled to the photodiodes 218-1, 218-2, 218-3, and 218-4, respectively. A floating diffusion 222 is coupled to the photodiodes 218-1, 218-2, 218-3, and 218-4 through transfer transistors 220-1, 220-2, 220-3, and 220-4, respectively, to receive the photogenerated charge from photodiodes 218-1, 218-2, 218-3, and 218-4. A gate of source follower transistor 226 is coupled to the floating diffusion 222 to generate an image signal 234 in response to the charge in the floating diffusion 222 that is photogenerated by the photodiodes 218-1, 218-2, 218-3, and 218-4. In one example, the image signal 234 includes a current $I_{IMAGE}$ that is coupled to be readout through a row select transistor 228 and received by image readout circuitry 216 in the bottom die 206 through a hybrid bond 265 from top die 202 to second die 204, which is then routed through a TSV 210 through the second die 204 to the bottom die 206 as shown.

In the example depicted in FIG. 2, a reset transistor 224 is coupled to floating diffusion 222. In one example, reset transistor 224 is coupled to reset the photogenerated charge in pixel cell 208. For instance, in one example, reset transistor 224 is coupled to reset the charge in the floating diffusion 222. In one example, reset transistor 224 is also coupled to photodiodes 218-1, 218-2, 218-3, and 218-4 through transfer transistors 220-1, 220-2, 220-3, and 220-4 to reset the charge in photodiodes 218-1, 218-2, 218-3, and 218-4.

It is appreciated that the design of example pixel cell 208 bears some resemblance to a 4-transistor (4T) pixel. In various examples, it is noted that a 3T-like pixel design may also be implemented. In such an example, the transfer transistors 220-1, 220-2, 220-3, and 220-4 and floating diffusion 222 are not included in pixel cell 208, and that the reset transistor 224 and the gate of source follower 226 are coupled directly to a photodiode 218 instead of being coupled through a transfer transistor 220.

However, one difference between pixel cell 208 of FIGS. 2 and 3T or 4T pixel designs is that the drain of the reset transistor is not coupled to a pixel supply voltage in top die 202. Instead, as shown in the illustrated example, the drain of reset transistor 224 in top die 202 is coupled through a conductor 238 to a first node 256 of a mode select circuit 230 in an event sensing cell 212 disposed in the second die 204 in accordance with the teachings of the present invention. As mentioned, the pixel cell 208 example illustrated in FIG. 2 is one of the plurality of pixel cells 208<1>, 208<2>, ... 208<N²> that are included in an N×N cell of the pixel array. Thus, in the example, the conductor 238 is one of N² conductors as shown that are coupled to the first node 256 of mode select circuit 230 in the second die 204. As such, the first node 256 is coupled to N² conductors 238 and N² reset transistors 224 of the respective N² pixel cells 208 in the N×N pixel cell in top die 202 in accordance with the teachings of the present invention.

It is appreciated that there may be a variety of different permutations or variations of how the first node 256 of mode select circuit 230 in the second die 204 is coupled to the N² conductors 238 in the top die 202. For instance, in the example illustrated in FIG. 2, there may be one or more hybrid bonds 264 through which the conductors 238 in the top die 202 may be coupled to the first node 256 of mode select circuit 230 in the second die 204. In various examples, there may be 1 to N² hybrid bonds 264. To illustrate, assume in one example that there are 2 hybrid bonds 264, numbered for instance 264-1 and 264-2. In that example, the conductors 238 of pixel cells 208<1:N²/2> are pre-coupled together in the top die 202 before eventually being coupled to a first hybrid bond 264-1, which is then to the first node 256 of mode select circuit 230 in the second die 204. Continuing with that example, the remaining conductors 238 of pixel cells 208<(N²/2)+1:N²> are pre-coupled together in the top die 202 before eventually being coupled to the second hybrid bond 264-2, which is then to the first node 256 of mode select circuit 230 in the second die 204.

In the illustrated example, the drain of reset transistor 224 is coupled to the first node 256 through pixel level hybrid bond 264 along conductor 238 between the top die 202 and the second die 204. During a normal imaging mode, the mode select circuit 230 is configured to couple the first node 256 to a second node 258 (I) in response to a mode select signal 232. In the example, the second node 258 of the mode select circuit 230 is coupled to a pixel supply voltage PIXVD. Thus, in the example depicted in FIG. 2, the normal imaging mode is selected, and the event driven mode is deselected. Therefore, during a normal imaging mode, the drain of reset transistor 224 is coupled to receive the pixel supply voltage PIXVD from the second die 204 via the hybrid bond 264 in accordance with the teachings of the present invention. As such, the drain of reset transistor 224 is coupled to pixel supply voltage PIXVD to reset the image charge in pixel cell 208 during normal imaging mode.

As will be discussed in greater detail below, FIG. 2 also illustrates that the event sensing cell 212 in second die 204 also includes event driven circuitry 266 that is coupled to a third node 260 of the mode select circuit 230. During an event driven mode, the mode select circuit 230 is configured to couple the first node 256 to the third node 260 (E) instead of second node 258 in response to the mode select signal 232 in accordance with the teachings of the present invention.

Figure 3:
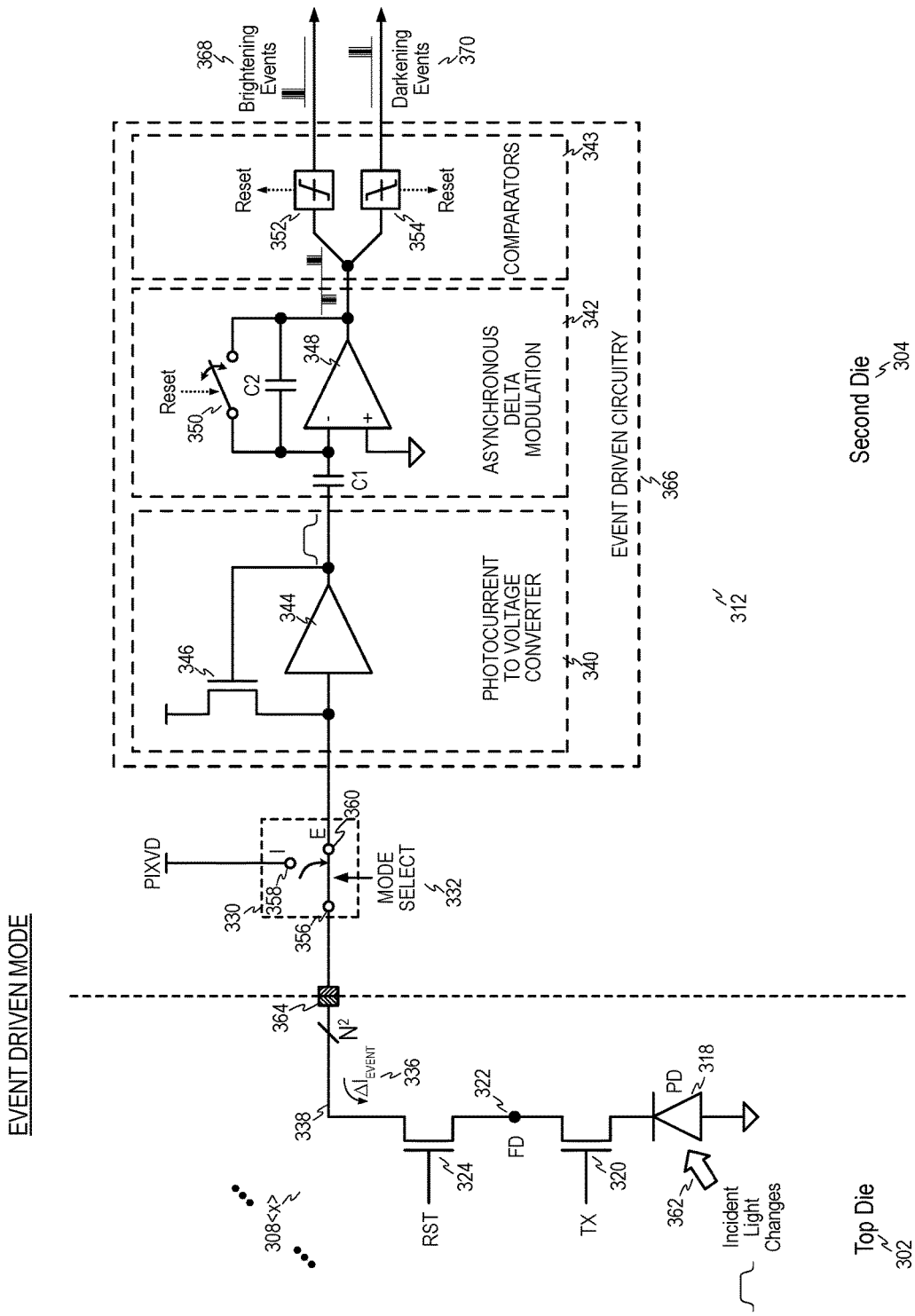
FIG. 3 illustrates one example schematic of an image sensor with an event driven mode selected and a normal imaging mode deselected in accordance with the teachings of the present disclosure.

To illustrate, FIG. 3 illustrates one example schematic of stacked CIS system 300 with an event driven mode selected and a normal imaging mode deselected in accordance with the teachings of the present disclosure. It is appreciated the stacked CIS system 300 of FIG. 3 may be another example of the stacked CIS system 200 as shown in FIG. 2 and/or another example of the stacked CIS system 100 as shown in FIG. 1, and that similarly named and numbered elements described above are coupled and function similarly below.

As shown in the example, during the event driven mode the mode select circuit 330 is configured to couple the first node 356 to the third node 360 (E) in response to the mode select signal 332 in accordance with the teachings of the present invention. Thus, in the example depicted in FIG. 3, the event driven mode is selected, and the normal imaging mode is deselected. As such, the event driven circuitry 366 in the second die 304 during the event driven mode is now coupled to the N² reset transistors 324 through the respective N² conductors 338 and pixel level hybrid bonds 364 that are coupled to first node 356 in accordance with the teachings of the present invention. In the example depicted in FIG. 3, it is noted that a non-shared pixel design is illustrated for explanation purposes. As shown, the photodiode 318, the transfer transistor 320, and the reset transistor 324 in top die 302, combined with event driven circuitry 366 in second die 304, function together as an event driven pixel to generate ultra-high speed event pulses 368 and 370 during the event driven mode in accordance with the teachings of the present invention.

In operation, the transfer transistor 320 and the reset transistor 324 are switched ON during the event driven mode. As such, incident light 362 that is incident on photodiode 318 photogenerates charge, which results in a photocurrent that flows through photodiode 318, transfer transistor 320, reset transistor 324, mode select circuit 330, and event driven circuitry 366 during the event driven mode. If the scene is static and thus there is no event occurring, the brightness of incident light 362 remains unchanged. As such, the photocurrent generated by photodiode 318 remains constant. However, if an event occurs (e.g., movement, etc.) in the scene, the event is indicated with an asynchronous change in the brightness of incident light 362. As such, there is an asynchronous change or delta in the photocurrent generated by photodiode 318. The change or delta in the photocurrent is indicated in the FIG. 3, with the photocurrent signal $\Delta I_{EVENT}$ 336.

FIG. 3 illustrates one example of event driven circuitry 366, which includes a photocurrent to voltage converter 340 coupled to an asynchronous delta modulation circuit 342, which is coupled to a comparators stage 343 as shown. In various examples, the photocurrent to voltage converter 340 converts the photocurrent signal $\Delta I_{EVENT}$ 336 to an output voltage signal. In one example, photocurrent to voltage converter 340 logarithmically converts the photocurrent signal $\Delta I_{EVENT}$ 336 generated by photodiode 318 to the output voltage signal.

In one example, the photocurrent to voltage converter 340 is implemented with an amplifier 344 having an input coupled to receive the photocurrent signal $\Delta I_{EVENT}$ 336 from the third node 360 of mode select circuit 330. The output of the amplifier 344 is coupled to a gate terminal of transistor 346. The drain of transistor 346 is coupled to a voltage supply, and the source of the transistor 346 is coupled to the input of amplifier 344 to form a feedback loop. As such, the asynchronous changes in the brightness that occur in incident light 362 are converted through photocurrent signal $\Delta I_{EVENT}$ 336 to the output voltage signal generated at the output of the amplifier 344 of photocurrent to voltage converter 340.

As shown in FIG. 3, one example of an asynchronous delta modulation circuit 342 is implemented with an operational amplifier 348 having an inverting input capacitively coupled to the output of the amplifier 344 through a first capacitor C1. The non-inverting input of operational amplifier 348 is coupled to ground. A second capacitor C2 is coupled between the output of the operational amplifier 348 and the inverting input of the operational amplifier 348. In addition, a reset switch 350 is also coupled between the output of the operational amplifier 348 and the inverting input of the operational amplifier 348.

As shown in the depicted example, the output of the operational amplifier 348 is coupled to a first threshold detector 352 and a second threshold detector 354 in the comparators stage 343. The first threshold detector 352 is coupled to output a brightening events signal 368 in response to the output of the operational amplifier 348 and the second threshold detector 354 is coupled to output a darkening events signal 370 in response to the output of the operational amplifier 348. The reset switch 350 is coupled to be switched in response to the output of the first threshold detector 352 and/or the second threshold detector 354.

In operation, if there are no changes in the photocurrent signal $\Delta I_{EVENT}$ 336 from photodetector 318, then the there are no pulses modulated in the brightening events signal 368 or in the darkening events signal 370. However, if there are events in the incident light 362, there are changes in the photocurrent signal $\Delta I_{EVENT}$ 336, which causes changes in the output voltage of photocurrent to voltage converter 340, which are then also amplified by the operational amplifier 348 as coupled in FIG. 3. The amplified output of operational amplifier 348 is coupled to be received by first threshold detector 352 and the second threshold detector 354.

In the depicted example, when the amplified output of operational amplifier 348 has a positive slope and crosses a first threshold of first threshold detector 352, a pulse is asynchronously modulated into the brightening events signal 368 and then the operational amplifier 348 is then reset in response to switch 350. Similarly, when the amplified output of operational amplifier 348 has a negative slope and crosses a second threshold of second threshold detector 352, a pulse is asynchronously modulated into the darkening events signal 368 and then the operational amplifier 348 is then reset in response to switch 350. It is therefore appreciated that in one example, as the magnitude of the slope of the amplified output of operational amplifier 348 increases, the frequency of pulses in the brightening events signal 368 or the darkening events signal 370 also increases. Further, when there are no events, the slope of the amplified output of operational amplifier 348 is zero and thus there are no pulses in the brightening events signal 368 or the darkening events signal 370.

In other words, the occurrences of changes are asynchronous in nature, and therefore the occurrences of pulses modulated into the brightening events signal 368, or of pulses modulated into the darkening events signal 370, are also asynchronous. With the asynchronous nature of the event driven circuitry 366, it is appreciated that fewer samples are output during uneventful periods with small signal variation, which reduces overall power consumption and bandwidth requirements. Furthermore, when events do occur, the asynchronous nature of the event driven circuitry 366 enables ultra-high speed event capture with ultra-fast response times in response to detected changes in photocurrent signal $\Delta I_{EVENT}$ 336 by event driven circuitry 366 in accordance with the teachings of the present invention. In one example, the brightening events signal 368 or in the darkening events signal 370 are coupled to be received for processing by event driven circuitry, such as for example the event peripheral circuitry 114 shown in FIG. 1.

As mentioned in the examples described above, the first node 356 of mode select circuit 330 and therefore the event driven circuit 366 are coupled to a plurality of pixel circuits in the top die 302. For instance, in one example, an N×N cell such as an 8×8 cell of pixel cells are coupled to event driven circuit 366 through mode select circuit 330 during an event driven mode. As such, during the event driven mode the event driven circuit 366 is coupled to be driven in response to a combination of a plurality of $\Delta I_{EVENT}$ 336 photocurrent signals from every pixel cell in the N×N cell to detect the changes in the combination of the plurality of the $\Delta I_{EVENT}$ 336 photocurrent signals from the 8×8 cell. Thus, assuming for example a 64 MP image sensor with 8×8 groupings of pixel cells coupled to each event driven cell 312 of the event driven sensing array, a 1 MP event sensing array is provided with the 64 MP image sensor in accordance with the teachings of the present invention. Furthermore, it is appreciated that the 1 MP event sensing array is also fully aligned with the 64 MP image sensor array, and therefore the viewing angles of the 64 MP image sensor array and the corresponding 1 MP event sensing array are fully aligned for both image capture as well as ultra-high speed event capture in accordance with the teachings of the present invention.

Figure 4:
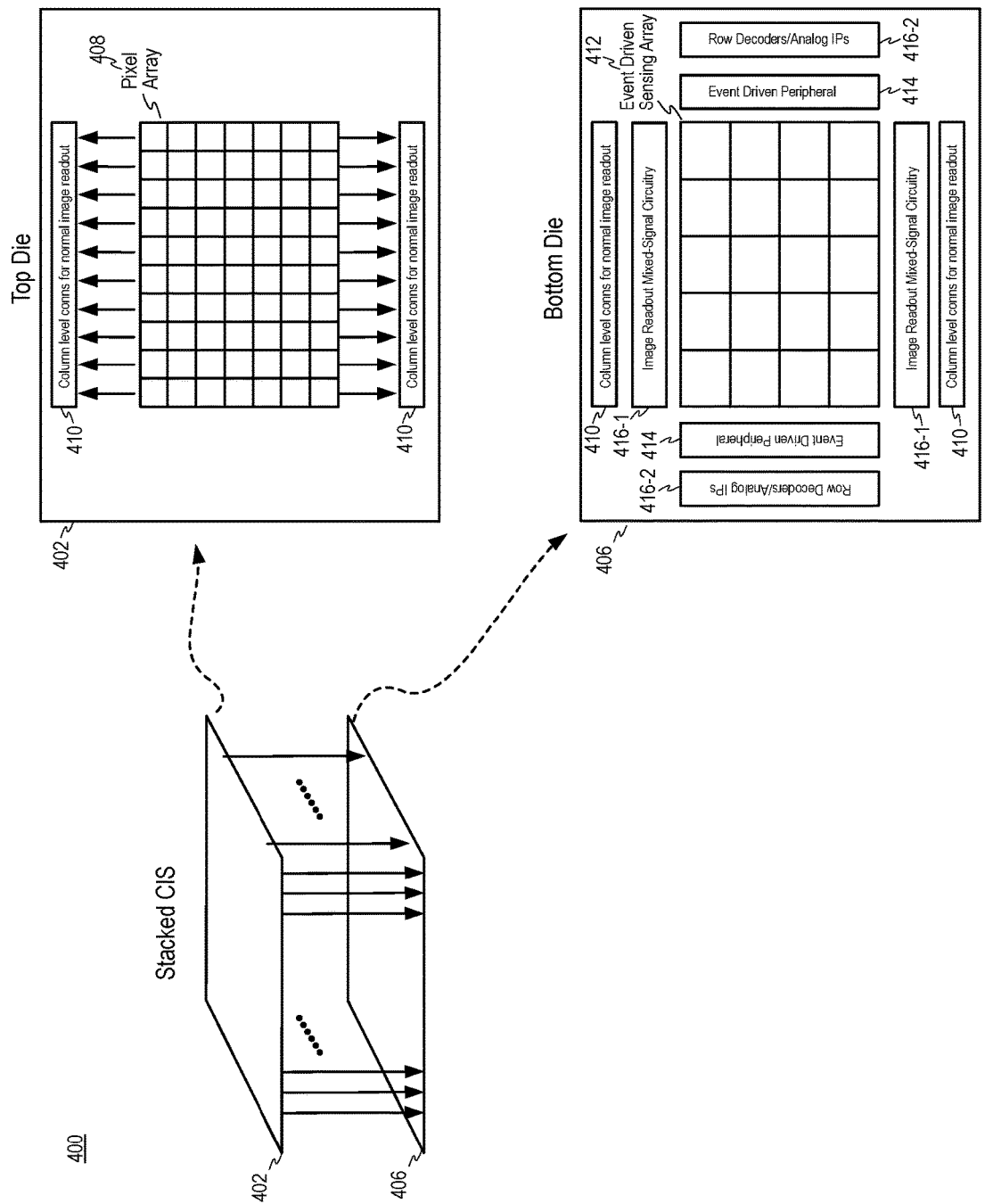
FIG. 4 illustrates one example of stacked CIS system in accordance with the teachings of the present invention.

FIG. 4 illustrates another example of stacked CIS system 400 in accordance with the teachings of the present invention. It is appreciated the stacked CIS system 400 of FIG. 4 may be another example of the stacked CIS system 100 as shown in FIG. 1, and that similarly named and numbered elements described above are coupled and function similarly below. In particular, it is appreciated that stacked CIS system 400 of FIG. 4 is an alternative approach to the stacked CIS system 100 of FIG. 1, with a primary difference being that the second die 104 and bottom die 106 in stacked CIS system 100 as shown in FIG. 1 are consolidated into a single bottom die 406 in stacked CIS system 400 of FIG. 4. Thus, stacked CIS system 400 is a stack of two dice instead of a stack of three dice. Therefore, as shown in the example depicted in FIG. 4, the top die 402 of stacked CIS system 400 includes a pixel array 408, which is similar to the pixel array 108 of FIG. 1. In addition, the bottom die 406 of stacked CIS system 400 of FIG. 4 includes event driven sensing array 412 and associated event driven peripheral circuitry 414. Furthermore, the bottom die 406 of stacked CIS system 400 of FIG. 4 also includes readout circuitry components coupled to readout the normal image data from pixel array 408. In the depicted example, the readout circuitry components included in bottom die 406 include image readout mixed-signal circuitry 416-1 and row decoders and analog image processors 416-2. In various examples, the image readout mixed-signal circuitry 416-1 may include analog to digital conversion circuitry, amplifiers, and I/O interfaces, etc. In one example, the circuitry of top die 402 may be coupled to the circuitry of bottom die 406 through hybrid bonds, TSVs, or other suitable circuit coupling technologies.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. An image sensor, comprising:
  a pixel cell, comprising:
    a photodiode configured to photogenerate charge in response to incident light;
    a source follower transistor coupled to the photodiode to generate an image signal in response to the charge photogenerated by the photodiode, wherein the image signal is coupled to be received by image readout circuitry through a row select transistor of the pixel cell; and
    a reset transistor coupled to reset the charge photogenerated by the photodiode;
  a mode select circuit having a first node coupled to the reset transistor and a second node coupled to a pixel supply voltage; and
  an event driven circuit coupled to a third node of the mode select circuit,
  wherein the mode select circuit is configured to couple the first node to the second node during an imaging mode to supply the pixel supply voltage to the reset transistor to reset the photodiode, and
  wherein the mode select circuit is further configured to couple the first node to the third node during an event driven mode to couple a photocurrent of the photodiode responsive to the incident light to drive the event driven circuit through the reset transistor to detect changes in the photocurrent of the photodiode, wherein the event driven circuit comprises:
    a current to voltage converter coupled to the third node of the mode select circuit, wherein the current to voltage converter is coupled to convert the photocurrent of the photodiode to an output voltage signal responsive to the photocurrent of the photodiode, and
    an asynchronous delta modulation circuit coupled to the current to voltage converter, and
    a comparator stage coupled to the asynchronous delta modulation circuit, wherein the asynchronous delta modulation circuit and comparator stage are coupled to generate asynchronously a first event signal modulated in response to a positive slope in the output voltage signal from the current to voltage converter, and wherein the asynchronous delta modulation circuit and comparator stage are further coupled to generate asynchronously a second event signal modulated in response to a negative slope in the output voltage signal from the current to voltage converter.

2. The image sensor of claim 1, wherein the pixel cell further comprises:
  a transfer transistor coupled to the photodiode; and
  a floating diffusion coupled to the transfer transistor to receive the photogenerated charge from the photodiode through the transfer transistor,
  wherein a gate terminal of the source follower is coupled to the floating diffusion, wherein the source follower is coupled to generate the image signal in response to the charge in the floating diffusion,
  wherein during the imaging mode the reset transistor is further coupled to reset the floating diffusion, and the photodiode through the transfer transistor, and
  wherein during the event driven mode the mode select circuit is further configured to couple the photocurrent of the photodiode to drive the event driven circuit through the transfer transistor and the reset transistor to detect the changes in the photocurrent of the photodiode.

3. The image sensor of claim 2, wherein the photodiode is one of a plurality of photodiodes included in the pixel cell, wherein the transfer transistor is one of plurality of transistors included in the pixel cell, wherein each one of the plurality of transfer transistors is coupled between a corresponding one of the plurality of photodiodes and the floating diffusion.

4. The image sensor of claim 2, wherein the pixel cell is one of a plurality of pixel cells included in a pixel array, wherein the pixel array is further arranged into a plurality of groupings of pixel cells.

5. The image sensor of claim 4, wherein the first node of the mode select circuit is further coupled to a reset transistor of every pixel cell of one of the plurality of groupings of pixel cells, wherein during the event driven mode the event driven circuit is further coupled to be driven in response to a combination of a plurality of photocurrents of said every pixel cell of one of the plurality of groupings of pixel cells to detect the changes in the combination of the plurality of photocurrents.

6. The image sensor of claim 5, wherein each one of the plurality of groupings of pixel cells includes an N×N grouping of pixel cells.

7. The image sensor of claim 5, wherein each one of the plurality of groupings of pixel cells includes a 4×4 grouping of pixel cells.

8. The image sensor of claim 5, wherein mode select circuit and the event driven circuit are included in an event sensing cell, wherein the event sensing cell is one of a plurality of event sensing cells in an event driven sensing array coupled to the pixel array.

9. The image sensor of claim 1, wherein the current to voltage converter comprises:
  an amplifier having an input coupled to the third node of the mode select circuit; and a transistor having a gate coupled to an output of the amplifier, wherein the transistor is further coupled between a voltage supply and the input of the amplifier, wherein the output of the amplifier is coupled to generate an output voltage signal responsive to the photocurrent of the photodiode.

10. The image sensor of claim 1, wherein the asynchronous delta modulation circuit comprises:
an operational amplifier having a non-inverting input coupled ground and an inverting input capacitively coupled to an output of the current to voltage converter through a first capacitor;
a second capacitor coupled between the inverting input and an output of the operational amplifier; and
a reset switch coupled between the inverting input and the output of the operational amplifier.

11. The image sensor of claim 10, wherein the comparator stage comprises:
a first threshold detector coupled to the output of the operational amplifier to generate asynchronously the first event signal; and
a second threshold detector coupled to the output of the operational amplifier to generate asynchronously the second event signal, wherein the reset switch is coupled to be switched in response to the first and second threshold detectors.

12. A stacked complementary metal oxide semiconductor image sensor (CIS) system, comprising:
a first die including a pixel array including a plurality of pixel cells arranged in rows and columns, wherein each one of the pixel cells comprises:
a photodiode configured to photogenerate charge in response to incident light;
a source follower transistor coupled to the photodiode to generate an image signal in response to the charge photogenerated by the photodiode, wherein the image signal is coupled to be received by image readout circuitry through a row select transistor of the pixel cell; and
a reset transistor coupled to reset the charge photogenerated by the photodiode; and
a second die stacked with the first die, wherein the second die comprises:
a mode select circuit having a first node coupled to the reset transistor through a hybrid bond between the first die and the second die, wherein the mode select circuit further includes a second node coupled to a pixel supply voltage; and
an event driven circuit coupled to a third node of the mode select circuit,
wherein the mode select circuit is configured to couple the first node to the second node during an imaging mode to supply the pixel supply voltage to the reset transistor though the hybrid bond to reset the photodiode, and
wherein the mode select circuit is further configured to couple the first node to the third node during an event driven mode to couple a photocurrent of the photodiode responsive to the incident light to drive the event driven circuit through the reset transistor and through the hybrid bond to detect changes in the photocurrent of the photodiode.

13. The stacked CIS system of claim 12, wherein the second die further includes the readout circuitry, wherein the pixel array is coupled to the readout circuitry through the hybrid bond between the first die and the second die.

14. The stacked CIS system of claim 12, further comprising a third die including the image readout circuitry,
wherein the first die, the second die, and the third die are coupled together in a stacked chip scheme, wherein the pixel array is further coupled to the image readout circuitry in the third die through through-silicon vias coupled between the first die and the third die and though the second die.

15. The stacked CIS system of claim 12, wherein each one of the pixel cells further comprises:
a transfer transistor coupled to the photodiode; and
a floating diffusion coupled to the transfer transistor to receive the photogenerated charge from the photodiode through the transfer transistor,
wherein a gate terminal of the source follower is coupled to the floating diffusion, wherein the source follower is coupled to generate the image signal in response to the charge in the floating diffusion,
wherein during the imaging mode the reset transistor is further coupled to reset the floating diffusion, and the photodiode through the transfer transistor, and
wherein during the event driven mode the mode select circuit is further configured to couple the photocurrent of the photodiode to drive the event driven circuit through the transfer transistor, through the reset transistor, and through the hybrid bond to detect the changes in the photocurrent of the photodiode.

16. The stacked CIS system of claim 15, wherein the photodiode is one of a plurality of photodiodes included in the pixel cell, wherein the transfer transistor is one of plurality of transistors included in the pixel cell, wherein each one of the plurality of transfer transistors is coupled between a corresponding one of the plurality of photodiodes and the floating diffusion.

17. The stacked CIS system of claim 15, wherein the pixel array is further arranged into a plurality of groupings of pixel cells, wherein the first node of the mode select circuit is further coupled to a reset transistor of every pixel cell of one of the plurality of groupings of pixel cells, wherein during the event driven mode the event driven circuit is further coupled to be driven in response to a combination of a plurality of photocurrents of said every pixel cell of one of the plurality of groupings of pixel cells to detect the changes in the combination of the plurality of photocurrents.

18. The stacked CIS system of claim 17, wherein the hybrid bond is one of a plurality of hybrid bonds between the first die and the second die through which the mode select circuit is coupled to the reset transistor of every pixel cell of one of the plurality of groupings of pixel cells.

19. The stacked CIS system of claim 17, wherein each one of the plurality of groupings of pixel cells includes an N×N grouping of pixel cells.

20. The stacked CIS system of claim 17, wherein each one of the plurality of groupings of pixel cells includes a 4×4 grouping of pixel cells.

21. The stacked CIS system of claim 17, wherein mode select circuit and the event driven circuit are included in an event sensing cell, wherein the event sensing cell is one of a plurality of event sensing cells in an event driven sensing array in the second die and coupled to the pixel array.

22. The stacked CIS system of claim 12, wherein the event driven circuit comprises:
a current to voltage converter coupled to the third node of the mode select circuit, wherein the current to voltage converter is coupled to convert the photocurrent of the photodiode to an output voltage signal responsive to the photocurrent of the photodiode;

an asynchronous delta modulation circuit coupled to the current to voltage converter; and a comparator stage coupled to the asynchronous delta modulation circuit, wherein the asynchronous delta modulation circuit and comparator stage are coupled to generate asynchronously a first event signal modulated in response to a positive slope in the output voltage signal from the current to voltage converter, and wherein the asynchronous delta modulation circuit and comparator stage are coupled to generate asynchronously a second event signal modulated in response to a negative slope in the output voltage signal from the current to voltage converter.

23. The stacked CIS system of claim 22, wherein the current to voltage converter comprises:

an amplifier having an input coupled to the third node of the mode select circuit; and a transistor having a gate coupled to an output of the amplifier, wherein the transistor is further coupled between a voltage supply and the input of the amplifier, wherein the output of the amplifier is coupled to generate an output voltage signal responsive to the photocurrent of the photodiode.

24. The stacked CIS system of claim 22, wherein the asynchronous delta modulation circuit comprises:

an operational amplifier having a non-inverting input coupled ground and an inverting input capacitively coupled to an output of the current to voltage converter through a first capacitor;

a second capacitor coupled between the inverting input and an output of the operational amplifier; and a reset switch coupled between the inverting input and the output of the operational amplifier.

25. The stacked CIS system of claim 24, wherein the comparator stage comprises:

a first threshold detector coupled to the output of the operational amplifier to generate asynchronously the first event signal; and a second threshold detector coupled to the output of the operational amplifier to generate asynchronously the second event signal, wherein the reset switch is coupled to be switched in response to the first and second threshold detectors.

* * * * *